United States Patent Office 3,405,129
Patented Oct. 8, 1968

3,405,129
PYRIDAZINES
Kurt Eichenberger and Paul Schmidt, Therwil, and Max Wilhelm, Allschwil, Switzerland, assignors to Ciba Corporation, New York, N.Y., a corporation of Delaware
No Drawing. Filed May 14, 1965, Ser. No. 455,982
Claims priority, application Switzerland, June 11, 1964, 7,608/64
3 Claims. (Cl. 260—240)

ABSTRACT OF THE DISCLOSURE

Anti-parasitic and anti-bacterial pyridazines of the formula

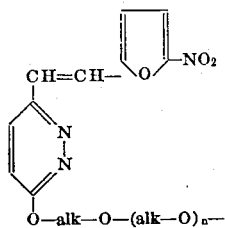

in which R represents a hydrogen atom or a lower alkyl radical, the symbols alk represent lower alkylene radicals that separate the oxygen atoms by at least 2 carbon atoms, and $n$ represents an integer of at most 2.

---

The present invention relates to new pyridazines. Especially it concerns pyridazines of the formula

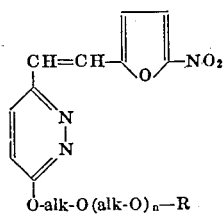

in which R represents a hydrogen atom or a lower alkyl radical, the symbols alk represent lower alkylene radicals that separate the oxygen atoms by at least 2 carbon atoms, and $n$ represents an integer of at most 2.

A lower alkyl radical is, for example, a methyl, ethyl, propyl, isopropyl, butyl or pentyl radical.

The lower alkylene radicals alk are, in particular, straight-chain or branched lower alkylene radicals, for example, 1:2-ethylene, 1:2-propylene, 1:2-butylene, 1:3-propylene, 1:3-butylene or 2:3-butylene radicals.

The symbol $n$ stands for 1 or 2.

The new compounds possess valuable pharmacological properties, especially anti-parasitic and anti-bacterial properties. Above all, they are effective against protozoa and worms and, for example, in the infected animal, for example, the mouse, they are effective against Gram-positive and Gram-negative bacteria, for example, Staphylococci, *Salmonella typhi* or Coli bacilli, for example, *Esch. coli.* Experiments carried out on mice and sheep, for example, show that the new compounds are, in particular, effective against schistosoma. Furthermore, they are effective against coccidia. Accordingly, the new compounds are useful as antiparasitic and anti-bacterial agents. In particular, they are suitable for the treatment of diseases caused by the above-mentioned pathogens. However, the new compounds are also valuable intermediate products for use in the preparation of other useful substances.

3-[2-(5-nitro-2-furyl)-vinyl] - 6 - (3:6:9-trioxadecyloxy)-pyridazine is specially effective.

The new compounds are obtained by methods in themselves known. Advantageously, the procedure is to react a compound of the formula

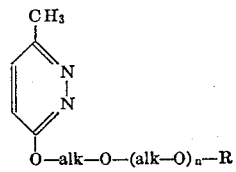

in which R, $n$ and alk have the meanings given above, with 5-nitrofurfural.

The reaction is carried out in the usual manner at room temperature or advantageously at an elevated temperature, if desired or required, in the presence of condensing agents or catalysts, for example, in the presence of agents that split off water. If desired, the products of the reaction that are not required, for example, water may be continuously removed from the reaction mixture.

The invention further includes any variant of the present process in which an intermediate product obtainable at any stage of the process is used as starting materials and any remaining steps are carried out, or in which the starting materials may be used in the form of salts and/or are formed under the reaction conditions.

It is advantageous to use those starting materials for the reactions of the invention that lead to the production of the compounds indicated above as being worthy of special mention.

The starting materials are known or can be produced by methods in themselves known.

The new compounds can be used, for example, for the manufacture of pharmaceutical preparations containing the said compounds in admixture with organic or inorganic, solid or liquid pharmaceutical excipients suitable for enteral, parenteral or local administation. Suitable excipients are substances that do not react with the new compounds, for example, water, gelatine, lactose, starch, stearyl alcohol, magnesium stearate, talcum, vegetable oils, benzyl alcohols, gums, propylene glycols, white petroleum jelly and any other known medicinal excipients. The pharmaceutical preparations may be, for example, tablets, dragees, capsules, ointments or creams, or in liquid form as solutions, suspensions or emulsions. If desired or required, they may be sterilized and/or contain assistants such as preserving, stabilizing, wetting or emulsifying agents, solvents, or salts for regulating the osmotic pressure or buffers. They may further contain other therapeutically valuable substances. The pharmaceutical preparations are prepared by conventional methods.

The new compounds can also be used, for example, in the form of feedstuffs or additives for feedstuffs. The usual extenders, diluents or feedstuffs are used.

The following examples illustrate the invention.

EXAMPLE 1

12.8 grams of 3-methyl - 6 - (3:6:9-trioxa-decyloxy)-pyridazine and 7.05 grams of nitrofurfural are heated for 4 hours at 140 to 150° C. in 50 millilitres of acetic anhydride. The evaporated reaction solution, which begins to crystallize after having been allowed to stand for some time, is dissolved in 2 N hydrochloric acid. The black solution is treated with carbon, filtered, and the filtrate is adjusted to pH 7 with saturated sodium hydrogen carbonate solution. The precipitated crystals are isolated by suction filtration and recrystallized from a mixture of acetone and petroleum ether. 3-[2-(5-nitro-2- furyl)-vinyl]-6-(3:6:9 - trioxa - decyloxy)-pyridazine of the formula

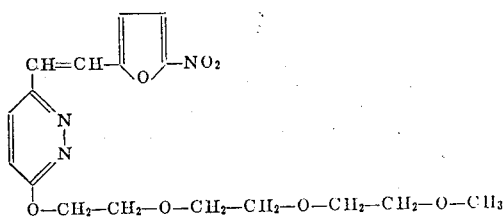

melting at 85 to 87° C. is thus obtained.

EXAMPLE 2

The new compounds can be used in the form of pharmaceutical preparations, the daily doses being 0.2–20 mg./kg. of the body weight. There may be administered, for example, capsules containing the desired quantity of the active compound, above all 3-[2-(5-nitro-2-furyl)-vinyl]-6-(3,6,9-trioxadecyloxy)-pyridazine.

For use as additives to animal fodder, e.g. poultry feed, the new compounds, particularly 3-[2-(5-nitro-2-furyl)-vinyl]-6-(3,6,9-trioxadecyloxy)-pyridazine, can be mixed with, for example, cerelose (content of active compound, for example, 0.2–2%, preferably 1%). This preliminary mix can be added to the fodder in the usual manner, advantageously so that the mixture contains about 0.02% of the pyridazine derivative.

EXAMPLE 3

Tablets containing 500 mg. of 3-[2-(5-nitro-2-furyl)-vinyl]-6-(3,6,9-trioxadecyloxy)-pyridazine can be made, for example, from the following ingredients:

| | Per tablet, mg. |
|---|---|
| 3-[2-(5-nitro-2-furyl) - vinyl] - 6 - (3,6,9 - trioxadecyloxy)-pyridazine | 500.0 |
| Wheat starch | 50.0 |
| Gelatine | 6.0 |
| Arrowroot | 20.0 |
| Talc | 18.0 |
| Magnesium stearate | 6.0 |
| | 600.0 |

Method of preparation.—The gelatine is dissolved with stirring in the 10-fold quantity of water on a steam bath. With the resulting solution, the mixture of 3-[2-(5-nitro - 2 - furyl) - vinyl] - 6 - (3,6,9 - trioxadecyloxy)-pyridazine is moistened homogeneously and kneaded until a plastic mass is obtained. The latter is forced through a 4–5 mm. mesh sieve, and dried at 45° C. The dry granulate is passed through a sieve with a mesh width of 0.8–1.5 mm., then mixed homogeneously with the disintegrating and lubricating agents. The mixture is compressed in the usual manner into tablets having a diameter of 11.5 mm. and a gross weight of 600 mg.

What is claimed is:
1. A compound of the formula

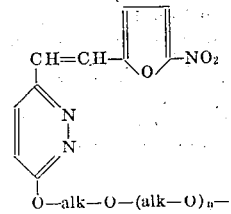

in which R stands for a member selected from the group consisting of hydrogen and lower alkyl, the symbols alk each stands for lower alkylene separating the oxygen atoms by at least two carbon atoms and $n$ stands for an integer from 1 to 2.

2. A compound of the formula

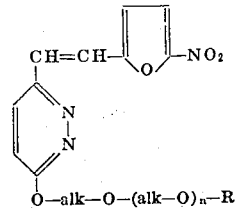

in which R stands for lower alkyl, the symbols alk each stands for a member selected from the group consisting of 1:2-ethylene, 1:2-propylene, 1:2-butylene, 1:3-butylene, 1:3-propylene and 2:3-butylene and $n$ stands for an integer from 1 to 2.

3. 3-[2-(5 - nitro - 2 - furyl)-vinyl]-6-(3:6:9-trioxadecyloxy)-pyridazine.

References Cited

FOREIGN PATENTS 630,163   9/1963   Belgium.

OTHER REFERENCES

Braker et al., J. Am. Chem. Soc., vol. 69, page 3072 (1947).

Chemical Abstracts, vol. 49, cols. 2438 to 2439 (1955) (abstract of Druey et al.).

JOHN D. RANDOLPH, *Primary Examiner.*